(12) United States Patent
Perez et al.

(10) Patent No.: US 12,466,162 B2
(45) Date of Patent: Nov. 11, 2025

(54) ARTICLE AND METHOD OF MAKING THE SAME

(71) Applicant: 3M INNOVATIVE PROPERTIES COMPANY, St. Paul, MN (US)

(72) Inventors: Mario A. Perez, Wellington, FL (US); Binhong Lin, Woodbury, MN (US); Jeffrey P. Kalish, Woodbury, MN (US); Erik M. Townsend, South St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 154 days.

(21) Appl. No.: 18/252,208

(22) PCT Filed: Jan. 7, 2022

(86) PCT No.: PCT/IB2022/050123
§ 371 (c)(1),
(2) Date: May 9, 2023

(87) PCT Pub. No.: WO2022/157591
PCT Pub. Date: Jul. 28, 2022

(65) Prior Publication Data
US 2023/0405971 A1 Dec. 21, 2023

Related U.S. Application Data

(60) Provisional application No. 63/140,556, filed on Jan. 22, 2021.

(51) Int. Cl.
*B32B 15/04* (2006.01)
*B32B 5/18* (2006.01)
(Continued)

(52) U.S. Cl.
CPC .............. *B32B 15/046* (2013.01); *B32B 5/18* (2013.01); *B32B 15/20* (2013.01); *C09J 7/38* (2018.01);
(Continued)

(58) Field of Classification Search
None
See application file for complete search history.

(56) References Cited

U.S. PATENT DOCUMENTS

| | | |
|---|---|---|
| 3,365,315 A | 1/1968 | Beck et al. |
| 4,291,130 A | 9/1981 | Saunders |

(Continued)

FOREIGN PATENT DOCUMENTS

| | | |
|---|---|---|
| CN | 105229101 A | 1/2016 |
| GB | 1414506 A | 11/1975 |
| JP | 2020032706 A * | 3/2020 |

OTHER PUBLICATIONS

Takasu, K., Metal Composite Foam Sheet, Mar. 5, 2020, machine translation of JP2020-032706 (Year: 2020).*

(Continued)

*Primary Examiner* — Chinessa T. Golden
(74) *Attorney, Agent, or Firm* — Bradford B. Wright; Carolyn A. Fischer

(57) ABSTRACT

An article comprises a substrate having a first portion comprising at least one of a metal or a ceramic metal oxide. A composite foam is bonded to the metal or ceramic metal oxide. The composite foam comprises: at least one polymer preparable by ring-opening metathesis polymerization; at least one catalyst for the ring-opening metathesis polymerization; at least one difunctional coupling agent represented by Z—X—Z. Each Z independently represents a group that is chemically reactive with at least one of the chemically bound surface hydroxyl groups thereby forming at least one (Continued)

covalent bond. Each X independently represents a divalent organic linking group having a number average molecular weight of 500 to 10000 grams per mole; and at least one of hollow glass microspheres or expanded polymeric microspheres. A method of making the article is also disclosed.

20 Claims, 1 Drawing Sheet

(51) Int. Cl.
    *B32B 15/20*     (2006.01)
    *C09J 7/38*     (2018.01)
    *C09J 11/04*     (2006.01)
    *C09J 11/08*     (2006.01)

(52) U.S. Cl.
    CPC ............... *C09J 11/04* (2013.01); *C09J 11/08* (2013.01); *B32B 2264/0214* (2013.01); *B32B 2264/101* (2013.01); *B32B 2264/2032* (2020.08); *B32B 2266/025* (2013.01); *B32B 2307/204* (2013.01); *B32B 2307/542* (2013.01); *B32B 2307/748* (2013.01); *B32B 2457/00* (2013.01); *C09J 2203/326* (2013.01); *C09J 2301/408* (2020.08); *C09J 2301/412* (2020.08); *C09J 2400/126* (2013.01); *C09J 2400/166* (2013.01); *C09J 2423/00* (2013.01); *C09J 2475/00* (2013.01)

(56) References Cited

U.S. PATENT DOCUMENTS

| | | | |
|---|---|---|---|
| 4,391,646 A | 7/1983 | Howell | |
| 4,400,340 A | 8/1983 | Klosiewicz | |
| 4,618,525 A | 10/1986 | Chamberlain et al. | |
| 4,751,337 A | 6/1988 | Espy et al. | |
| 5,198,511 A | 3/1993 | Brown-Wensley et al. | |
| 5,849,851 A | 12/1998 | Grubbs et al. | |
| 6,090,888 A | 7/2000 | Khanarian et al. | |
| 6,506,808 B1 | 1/2003 | Daum et al. | |
| 6,509,384 B2 | 1/2003 | Kron et al. | |
| 6,525,125 B1 | 2/2003 | Giardello et al. | |
| 6,800,170 B2 | 10/2004 | Kendall et al. | |
| 7,339,006 B2 | 3/2008 | Giardello et al. | |
| 9,370,876 B2 | 6/2016 | Rule et al. | |
| 11,518,914 B2 | 12/2022 | Heimink et al. | |
| 2002/0015519 A1 | 2/2002 | Tokas et al. | |
| 2007/0037940 A1 | 2/2007 | Lazzari et al. | |
| 2011/0028582 A1* | 2/2011 | Leimenstoll | C08G 18/4202 977/773 |
| 2015/0152283 A1 | 6/2015 | Stephen et al. | |
| 2016/0083628 A1* | 3/2016 | Heimink | C09C 3/12 556/466 |
| 2017/0253711 A1 | 9/2017 | Grossman et al. | |
| 2020/0115277 A1 | 4/2020 | Wang et al. | |
| 2020/0199349 A1 | 6/2020 | Gopalan | |

OTHER PUBLICATIONS

International Search report for PCT International Application No. PCT/IB2022/050123, mailed on Apr. 7, 2022, 4 pages.
Lyapkov, "Low-Density Polydicyclopentadiene Through the Use of Microspheres", Journal of Polymer Research, 2020, vol. 27, Article 178, pp. 1-10.

* cited by examiner

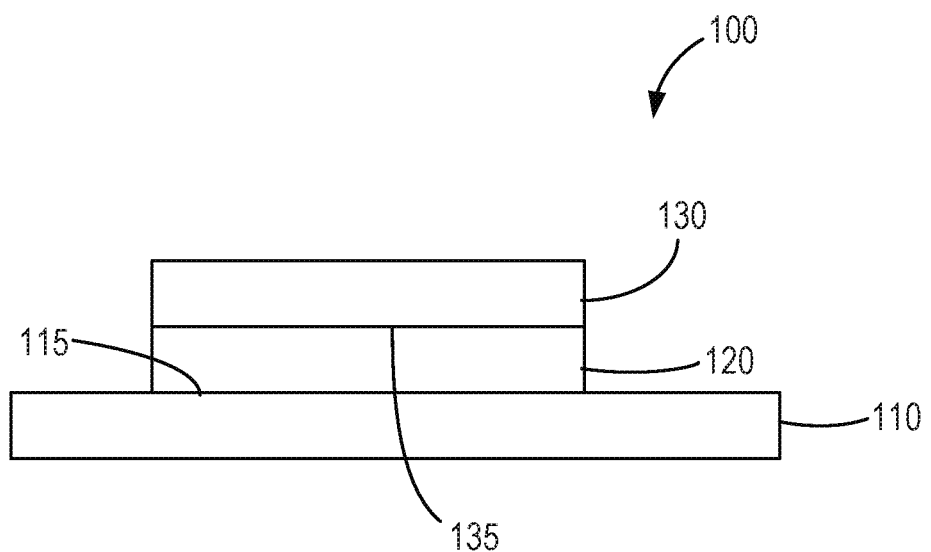

ARTICLE AND METHOD OF MAKING THE SAME

TECHNICAL FIELD

The present disclosure broadly relates to articles including a substrate and a composite foam, and methods of making them.

BACKGROUND

Fifth-generation wireless (5G) is the latest iteration of cellular technology, engineered to greatly increase the speed and responsiveness of wireless networks. 5G Communication technology promises significant advancements, such as faster speed, lower latency, improved connection density and wider coverage; thus enabling implementation of Internet of Things (IoT), augmented reality (AR) or virtual reality (VR) applications, factory automation, vehicular communications and other applications where security, reliability, quality of service and efficiency are critical.

With 5G, data transmitted over wireless broadband connections can travel at multigigabit speeds, with potential peak speeds as high as 20 gigabits per second (Gbps) by some estimates. The increased speed is achieved partly by using higher frequency radio waves than current cellular networks. However, higher frequency radio waves have a shorter range than the frequencies used by previous networks. To ensure wide service, 5G networks operate on up to three frequency bands, low, medium, and high. A 5G network will be composed of networks of up to 3 different types of cell, each requiring different antennas, each type giving a different tradeoff of download speed vs. distance and service area. 5G cellphones and wireless devices will connect to the network through the highest speed antenna within range at their location.

Low-band 5G uses a similar frequency range as current 4G cellphones, 600-700 MHz giving download speeds a little higher than 4G: 30-250 megabits per second (Mbit/s). Low-band cell towers will have a similar range and coverage area to current 4G towers. Mid-band 5G uses microwaves of 2.5-3.7 GHz, currently allowing speeds of 100-900 Mbit/s, with each cell tower providing service up to several miles radius. High-band 5G typically uses frequencies of 25-39 GHz, near the bottom of the millimeter wave band, to achieve download speeds of 1-3 gigabits per second (Gbit/s), comparable to cable internet.

Many materials used in the telecommunication industry today do not perform well at 5G frequencies. Thus, the higher frequencies of 5G necessitate the identification and development of materials that can function at those frequencies and not interfere with proper functioning of electronic devices communicating at high-band wavelengths. Examples include cell phones, extra base stations in addition to existing towers, and automotive radar/self-driving cars).

There is a need for low dielectric/low loss tangent (tan δ) materials that can perform at high band GHz (mm wavelength) frequencies. Other desirable material properties include low moisture uptake (since water dramatically increases dielectric constant) and thermal management capability (since higher power generates more heat), and for mm wave antennae substrates, adhesion to copper and stability at 250° C. (for solder re-flow).

SUMMARY

The present disclosure provides low dielectric constant, low dielectric loss, water-resistant materials suitable for use in 5G applications, for example.

In one aspect, the present disclosure provides an article comprising
a first substrate having a first portion comprising a first metal; and
a composite foam bonded to the at least one of the first metal or the ceramic metal oxide, the composite foam comprising:
at least one polymer preparable by ring-opening metathesis polymerization;
at least one catalyst for the ring-opening metathesis polymerization;
at least one difunctional coupling agent represented by

Z—X—Z wherein each Z independently represents a group that is chemically reactive with at least one of the chemically bound surface hydroxyl groups thereby forming at least one covalent bond, and
wherein each X independently represents a divalent organic linking group have a number average molecular weight of 500 to 10000 grams per mole; and
at least one of hollow glass microspheres or expanded polymeric microspheres.

In some embodiments, the article comprises an electronic device.

In a second aspect, the present disclosure provides a method of making an article, the method comprising steps:
a) contacting at least one metal portion of at least one substrate with a curable composition, wherein:
each at least one metal portion has surface hydroxyl groups; and
the curable composition comprises:
at least one monomer polymerizable by ring-opening metathesis polymerization;
at least one catalyst for the ring-opening metathesis polymerization;
at least one difunctional coupling agent represented by

Z—X—Z wherein each Z independently represents a group that is chemically reactive with at least one of the surface hydroxyl groups of one of the abrasive particles thereby forming at least one covalent bond, and
wherein each X independently represents a divalent organic linking group have a number average molecular weight of 500 to 10000 grams per mole; and
at least one of hollow glass microspheres, expanded polymeric microspheres, or unexpanded polymeric microspheres;
b) at least partially curing the curable composition; and
c) expanding any unexpanded polymeric microspheres, if present.

As used herein:
the term "metal" when used alone refers to a metal, in groups 3 through 14 of the Periodic Table of the Elements, in its elemental state; and
the term "metal oxide" refers to a composition comprising individual metal atoms bonded to oxygen, and may include multiple different types of metal atoms.

Features and advantages of the present disclosure will be further understood upon consideration of the detailed description as well as the appended claims.

BRIEF DESCRIPTION OF THE DRAWINGS

FIG. 1 is a schematic side view of an exemplary article 100 according to the present disclosure.

It should be understood that numerous other modifications and embodiments can be devised by those skilled in the art, which fall within the scope and spirit of the principles of the disclosure. The FIGURES may not be drawn to scale.

DETAILED DESCRIPTION

Referring now to FIG. 1, exemplary article 100 comprises a first substrate 110 having a first portion 115 in contact with composite foam 120. First portion 115 comprises at least one of a first metal or a first ceramic metal oxide. Composite foam 120 comprises at least one polymer prepared by ring-opening metathesis polymerization, at least one catalyst for the ring-opening metathesis polymerization, at least one difunctional coupling agent, and at least one of hollow glass microspheres or expanded polymeric microspheres. Optional second substrate 130 has a second portion 135 comprising at least one of a second metal or a second ceramic metal oxide. Composite foam 120 contacts and is bonded to first portion 115 of first substrate 110 and, if present, second portion 135 of the second substrate, 130.

The article may comprise a component (e.g., a frame, panel, or electronic component) having a first portion comprising a first metal bonded to the composite foam. The first metal should generally be exposed so that it can contact the composite foam directly, although a fugitive (e.g., soluble) coating may be permissible.

Exemplary articles 100 may include electronic articles such as circuit boards, cellular phones, computers (especially tablet and laptop computers that use wireless communication to connect to the internet), electrical components such as integrated circuits, electronic displays, electrical switches, diodes, transistors, capacitors, resistors (also including varistors), wires/cables, cell tower transponders, AM/FM/UHF/VHF/microwave receivers, microwave antennas, radios, ear buds, and headsets. Exemplary first portions include wires, electrical tabs/pins, circuit traces, antennas, metal plates, and metal panels.

The first portion comprises a first metal having surface hydroxyl groups, which is typically of most metals which form an oxide surface layer in air due to oxidation. Examples of such metals include aluminum, copper, silver, platinum, nickel, iron, tin, scandium, tantalum, tungsten, chromium, zinc, indium, and alloys thereof. Particularly preferred metals include copper, silver, aluminum, and alloys thereof.

The optional second substrate has a second portion that may comprise a second metal (e.g., as described above for the first metal) which may be the same as or different than the first metal; a metal oxide ceramic such as alpha alumina, sapphire, zirconia; porcelain; glass; quartz; plastic or a thermoset polymer; or a combination thereof, for example. Exemplary optional second substrates may include electrical components such as integrated circuits, electronic displays, diodes, transistors, capacitors, resistors (also including varistors), wires/cables, microwave antennas, and metal sheets and frames. Exemplary first portions include wires, electrical tabs/pins, circuit traces, antennas, metal plates, and metal panels.

The composite foam includes one or more polymers that are preparable by (e.g., prepared by) ring-opening metathesis polymerization (ROMP). ROMP is a well known process that converts cyclic olefins into polymer using a ROMP catalyst. Ring-opening metathesis polymerization of cycloalkene monomers typically yields crosslinked polymers having an unsaturated linear backbone. The degree of unsaturation of the repeat backbone unit of the polymer is the same as that of the monomer. For example, with a norbornene reactant in the presence of an appropriate catalyst, the resulting polymer may be represented by:

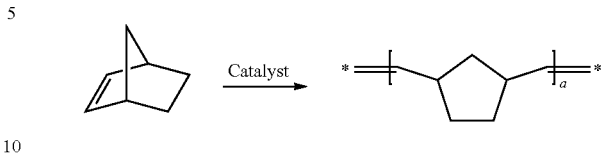

wherein a is the number of repeating monomer units in the polymer chain.

For another example, with dienes such as dicyclopentadiene in the presence of an appropriate catalyst, the resulting polymer may be represented by:

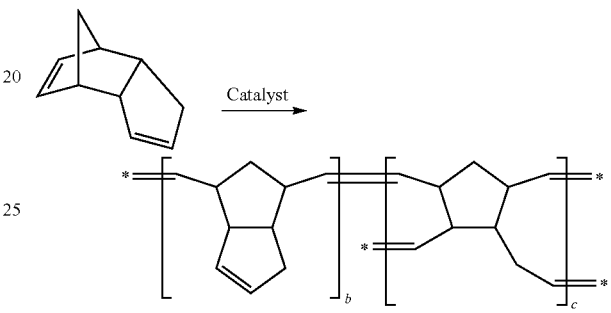

wherein b+c is the number of moles of polymerized monomer, and c/(b+c) is the mole fraction of monomer units which ring-open at both reactive sites and * indicates continued polymeric structure. As shown by the above reaction, metathesis polymerization of dienes, trienes, etc. can result in a crosslinked polymer. Representative cycloalkene monomers, catalysts, procedures, etc. that can be used in metathesis polymerizations are described, for example, in: U.S. Pat. No. 4,400,340 (Klosiewicz); U.S. Pat. No. 4,751,337 (Espy et al.); U.S. Pat. No. 5,849,851 (Grubbs et al.); and U.S. Pat. No. 6,800,170 B2 (Kendall et al.); and U. S. Pat. Appl. Publ. No. 2007/0037940 A1 (Lazzari et al.).

As used herein, the term "cyclic monomer" refers to monomers having at least one cyclic group and may include bicyclics and tricyclics.

Exemplary cyclic monomers suitable for ROMP polymerization include 7-oxabicyclo[2.2.1]hept-2-ene, alkyl norbornene, cis-cyclooctene, cyclopentadiene, cyclopentene, dicyclopentadiene, hexylnorbornylene, norbornadiene, norbornylene (2-norbornene), tetracyclo[6.2.13.6.0]dodeca-4,9-diene, tetracyclopentadiene, tricyclopentadiene, and derivatives thereof with substituents including aliphatic groups, aromatic groups, esters, amides, ethers, and silanes.

Combinations of cyclic monomers may be used. For example, a combination of dicyclopentadiene and norbornylene, dicyclopentadiene and an alkyl norbornylene may be used.

Useful alkyl norbornylenes may be represented by the formula:

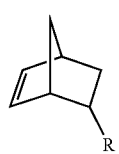

wherein R is an alkyl group comprising from 1 to 12 carbon atoms, e.g., 6 carbon atoms. One useful combination of cyclic monomers comprises dicyclopentadiene and hexylnorbornylene at a weight ratio of from about 10:90 to about 50:50. Another useful combination of cyclic monomers comprises dicyclopentadiene and cyclooctene at a weight ratio of from about 30:70 to about 70:30.

Additional examples of useful cyclic monomers include the following polycyclic dienes:

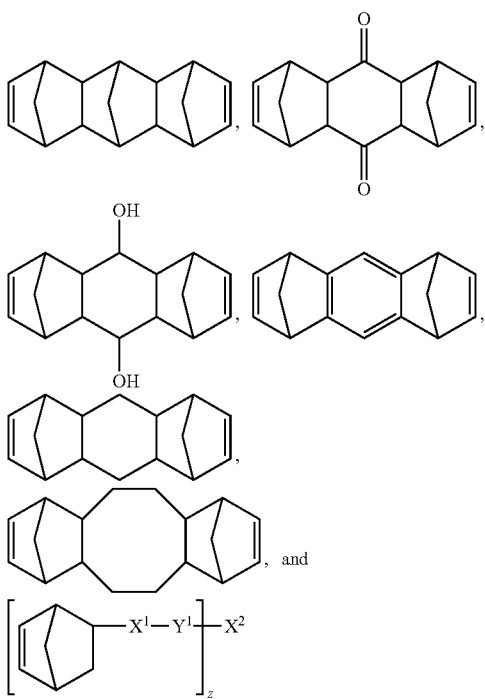

where $X^1$ is a divalent aliphatic or aromatic group with 0 to 20 carbon atoms; $X^2$ is a multivalent aliphatic or aromatic group with 0 to 20 carbon atoms; optional group $Y^1$ is a divalent functional group selected from the group consisting of esters, amides, ethers, and silanes; and z is 2 or greater.

Metathesis polymerization of dienes, trienes, etc. can result in a crosslinked polymer as described above for dicyclopentadiene. The degree to which crosslinking occurs depends on the relative amounts of different monomers and on the conversion of the reactive groups in those monomers, which in turn, is affected by reaction conditions including time, temperature, catalyst choice, and monomer purity. In general, at least some crosslinking is desired to provide suitable mechanical properties. The presence of crosslinking is indicated, for example, when the cured composition does not dissolve in some solvent such as toluene, but may swell in such solvents. Also, the crosslinked polymers are thermoset and not thermoplastic and cannot be made to flow upon heating. Typically, an at least partially cured composition becomes stiffer as the amount of crosslinking increases, thus the amount of crosslinking desired may depend on the desired stiffness of the cured composition (e.g., in an abrasive article).

In some embodiments, useful ROMP polymers may comprise a crosslinked unsaturated polymer formed by ring-opening metathesis polymerization of a crosslinker (a multicyclic monomer comprising at least two reactive double bonds) and a monofunctional monomer. For example, the unsaturated polymer may be comprised of dicyclopentadiene and a monofunctional monomer. The monofunctional monomer may be selected from the group consisting of cyclooctene, cyclopentadiene, an alkyl norbornene, and derivatives thereof. The monomer composition may also comprise from about 0.1 to about 75 wt. % of the crosslinker, relative to the total weight of the monomer composition. If dicyclopentadiene is used as a crosslinker, useful amounts are from about 10 to about 75 wt. % of dicyclopentadiene, relative to the total weight of the monomer composition. If the polycyclic dienes shown above are used as crosslinkers, useful amounts are from about 0.1 to about 10 wt. %, relative to the total weight of the monomer composition.

In embodiments in which at least two different cyclic monomers are used to make at least partially cured compositions (e.g., in abrasive articles), the relative amounts of the monomers may vary depending on the particular monomers and desired properties of the articles. The unsaturated polymer may comprise: from about 0 to about 100 wt. % of a multifunctional polycyclic monomer, and from about 0 to about 100 wt. % of a monofunctional cyclic monomer, both relative to the total weight of the polymer. In some embodiments, the mole ratio of multifunctional polycyclic monomer to monofunctional cyclic monomer comprises from about 1:3 to about 1:7.

The desired physical properties of a given at least partially cured composition may be used to select the particular monomer(s) used in the corresponding curable composition. If more than one monomer is used, these physical properties may also influence the relative amounts of the monomers used. Physical properties that may need to be considered include glass transition temperature ($T_g$) and Young's Modulus. For example, if a stiff composition is desired, then the particular monomer(s), and their relative amounts if more than one monomer is used, may be chosen such that the unsaturated polymer has a $T_g$ of greater than about 25° C. and a Young's Modulus greater than about 100 megapascals (MPa).

In choosing the relative amounts of comonomers, the contribution of each monomer to the glass transition temperature of the unsaturated polymer can be used to select an appropriate ratio. If a stiff cured composition is desired, the unsaturated polymer may have a $T_g$ greater than about 25° C. and a Young's Modulus greater than about 100 MPa. Monomers that may be used to make stiff composition include any of those described herein and particularly norbornylene, ethylidenenorbornene, dicyclopentadiene, and tricyclopentadiene, with dicyclopentadiene being particularly preferred. Any amount of crosslinking may be present.

If a flexible cured composition is desired, the unsaturated polymer may have a $T_g$ less than about 25° C. and a Young's Modulus less than about 100 MPa. Monomers that may be used to make flexible cured compositions may include combinations of crosslinkers and monofunctional cyclic monomers. Monomers that may be used to make flexible cured compositions include any of those described herein and particularly dicyclopentadiene, cyclooctene, cyclopentene, and alkyl norbornylenes such as the ones described above wherein $R^1$ comprises from 1 to 12 carbon atoms. The monomer composition may comprise from about 0.1 to about 75 wt. % of the crosslinker, relative to the total weight of the monomer composition with preferred amounts comprising from about 1 to about 50 wt. %, or from about 20 to about 50 wt. %. An exemplary curable composition comprises dicyclopentadiene and cyclooctene at a weight ratio of from about 30:70 to about 70:30, preferably about 50:50.

Another exemplary curable composition comprises dicyclopentadiene and hexylnorbornylene at a weight ratio of from about 10:90 to 50:50 preferably from about 20:80 to about 40:60.

One or more ROMP catalysts can be used to polymerize the cyclic monomer(s) to form ROMP polymer(s). Useful ROMP catalysts include, for example, transition metal carbene catalysts such as ruthenium, osmium, tungsten, molybdenum, and rhenium catalysts may be used, including versions of Grubbs catalysts and Grubbs-Hoveyda catalysts; see, for example, U.S. Pat. No. 5,849,851 (Grubbs et al.).

In some embodiments, the metathesis catalyst system comprises a compound of the formula:

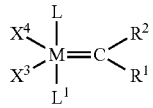

wherein:
M is selected from the group consisting of Os and Ru;
$R^1$ and $R^2$ are independently selected from the group consisting of hydrogen and a substituent group selected from the group consisting of $C_1$-$C_{20}$ alkyl, $C_2$-$C_{20}$ alkenyl, $C_2$-$C_{20}$ alkoxycalbonyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy and aryloxy; the substituent group optionally substituted with a moiety selected from the group consisting of $C_1$-$C_5$ alkyl, halogen, $C_1$-$C_5$ alkoxy and phenyl; the phenyl optionally substituted with a moiety selected from the group consisting of halogen, $C_1$-$C_5$ alkyl, and $C_1$-$C_5$ alkoxy;
$X^3$ and $X^4$ are independently selected from any anionic ligand; and
L and $L^1$ are independently selected from any phosphine of the formula $PR^3R^4R^5$, wherein $R^3$ is selected from the group consisting of neopentyl, secondary alkyl and cycloalkyl and wherein $R^4$ and $R^5$ are independently selected from the group consisting of aryl, neopentyl, $C_1$-$C_{10}$ primary alkyl, secondary alkyl, and cycloalkyl.

The metathesis catalyst system may also comprise a transition metal catalyst and an organoaluminum activator. The transition metal catalyst may comprise tungsten or molybdenum, including their halides, oxyhalides, and oxides. One particularly preferred catalyst is $WCl_6$. The organoaluminum activator may comprise trialkylaluminums, dialkylaluminum halides, or alkylaluminum dihalides. Organotin and organolead compounds may also be used as activators, for example, tetraalkyltins and alkyltin hydrides may be used. One particularly preferred catalyst system comprises $WCl_6/(C_2H_5)_2AlCl$.

The choice of particular catalyst system and the amounts used may depend on the particular monomers being used, as well as on desired reaction conditions, desired rate of cure, and so forth. In particular, it can be desirable to include the above-described osmium and ruthenium catalysts in amounts of from about 0.001 to about 0.3 wt. %, relative to the total weight of the unsaturated polymer. For curable compositions comprising cyclooctene, the osmium and ruthenium catalyst may be used. For curable compositions comprising dicyclopentadiene and alkylnorbornylenes, metathesis catalyst systems comprising tungsten are useful.

The curable composition may comprise additional components. For example, if the metathesis catalyst system comprises $WCl_6/(C_2H_5)_2AlCl$, then water, alcohols, oxygen, or any oxygen-containing compounds may be added to increase the activity of the catalyst system. Other additives can include chelators, Lewis bases, plasticizers, inorganic fillers, and antioxidants, preferably phenolic antioxidants.

Photocatalysts for catalyzing ROMP described in U.S. Pat. No. 5,198,511 (Brown-Wensley et al.), the disclosure of which is incorporated herein by reference, and may be used if photocuring is desired.

The composition foam includes one or more difunctional coupling agent represented by the formula

Each Z independently represents a group that is chemically reactive with at least one of the surface hydroxyl groups of one of the abrasive particles thereby forming at least one covalent bond. Examples include isocyanate groups (i.e., —N=C=O) and silyl groups having 1 to 3 hydrolyzable groups bonded thereto. Exemplary silyl groups can be represented by the formula —$SiR^6{}_aL^2{}_{(3-a)}$, wherein each $L^2$ independently represents a hydrolyzable group (e.g., Cl, Br, acetoxy, methoxy, ethoxy, and/or hydroxyl), wherein $R^6$ represents an alkyl group having from 1 to 4 carbon atoms, and wherein a is 0, 1, or 2. In preferred embodiments a is 0.

Each X independently represents a divalent organic linking group have a number average molecular weight ($M_n$) of 500 to 10000 grams per mole, preferably 600 to 6000 grams per mole. For example, the X may have an $M_n$ of 500, 600, 70, 800, 900, of 1000 grams/mole up to 6000, 7000, 8000, 9000, or 10000 grams/mole in any combination.

In some preferred embodiments, the difunctional coupling agent comprises an isocyanate-terminated polyurethane prepolymer; for example, a diphenylmethane diisocyanate (e.g., 4,4'-methylenebis(phenyl isocyanate))-terminated polyether prepolymer based on a polytetramethylene ether glycol. Exemplary polyalkylene ether diols include polyethylene glycol, polypropylene glycol, polytrimethylene ether glycol (i.e., $HO(CH_2CH_2CH_2O)_nH$), and polytetramethylene ether glycol (i.e., $HO(CH_2CH_2CH_2CH_2O)_nH$). The resulting prepolymers may have polyoxyalkylene divalent segments such as, for example, a polyoxyethylene segment, a polyoxypropylene segment, and/or a polyoxybutylene segment.

One preferred isocyanate-terminated polyurethane prepolymer is a modified diphenylmethane diisocyanate (MDI)-terminated polyether prepolymer based on polytetramethylene ether glycol (PTMEG) available as BAY fEC ME-230 from Covestro, Pittsburgh, Pennsylvania.

Isocyanate-terminated polybutadiene prepolymers can be prepared, for example, by reaction of a diisocyanate with a hydroxyl-terminated polyoxyalkylene or a hydroxyl-terminated polybutadiene. Polyoxyalkylene polymers having hydrolyzable silyl end groups can be prepared, for example, by reaction of a corresponding hydroxyl-terminated polyoxyalkylene with an isocyanato functional hydrolysable organosilane (e.g., isocyanatoethyltrimethoxysilane or isocyanatoethyltriethoxysilane).

Exemplary commercially available OH-terminated polybutadienes include those available from Evonik Industries AG, Essen, Germany, as POLYVEST HT ($M_n$=2,900 g/mole), and from Total Cray Valley, Exton, Pennsylvania, as POLY BD R-45HTLO ($M_n$=2800 g/mol), POLY BD R-20LM ($M_n$=1200), KRASOL LBH 2000 (2100 g/mol), and KRASOL LBH 3000 ($M_n$=3000 g/mol).

Silane-terminated polybutadienes can be prepared by anionic polymerization and capping the living end of the polybutadiene with a hydrolyzable silane (e.g., tetramethoxysilane or tetraethoxysilane). Suitable hydrolyzable silane-terminated liquid polybutadienes are also commercially available; for example, from Evonik Industries AG, as POLYVEST EP ST-M 60 ($M_n$ 3300 g/mole) and RICON 603 silane-functional polybutadiene ($M_n$=3300 g/mole, difunctional) from Total Cray Valley, Exton, Pennsylvania.

The composite foam includes at least one of hollow glass microspheres or expanded polymeric microspheres.

Exemplary expanded polymeric microspheres include those commercially available under the trade designation EXPANCEL from Nouryon, Amsterdam, The Netherlands. Details regarding EXPANCEL microspheres can be found in U.S. Pat. No. 6,509,384 (Bjerke et al.). They are available in various forms such as expanded and in solvent (EXPANCEL WE), or expanded and dry (EXPANCEL DE). EXPANCEL is also available in dry unexpanded form as a powder (EXPANCEL DU). EXPANCEL DU microspheres expand with heat during processing of the polymer film or coating.

EXPANCEL WE grades include EXPANCEL 461 WE 20 d36 ($D_{50}$=20-30 microns), EXPANCEL 461 WE 40 d36 ($D_{50}$=30-50 microns), and EXPANCEL 921 WE 40 d24 ($D_{50}$=35-55 microns). EXPANCEL DE grades include EXPANCEL 551 DE 40 d42 ($D_{50}$=25-50 microns), EXPANCEL 461 DE 20 d70 ($D_{50}$=15-25 microns), EXPANCEL 461 DE 40 d60 ($D_{50}$=20-40 microns), EXPANCEL 461 DE 40 d25 ($D_{50}$=35-55 microns), EXPANCEL 920 DE 40 d30 ($D_{50}$=35-55 microns), EXPANCEL 920 DE 40 d25 ($D_{50}$=30-60 microns), EXPANCEL 920 DE 80 d30 ($D_{50}$=55-85 microns), and EXPANCEL 043 DET 80 d20 ($D_{50}$=60-95 microns). EXPANCEL DU grades include 461 DU 20 and 043 DU 80. Size of the EXPANCEL DU grade depends on temperature and time, thus the size and density reduction of composites with EXPANCEL DU grades depend greatly on thermal history.

In other embodiments, hollow glass microspheres can also be utilized. Hollow glass microspheres can be fabricated as discussed in U.S. Pat. No. 3,365,315 (Beck); U.S. Pat. No. 4,391,646 (Howell); and U.S. Pat. No. 4,618,525 (Chamberlain et al.). Such exemplary hollow glass microspheres have a shell material that includes a glass. In some embodiments, the shell material includes $SiO_2$, $Na_2O$, CaO, $K_2O$, $Li_2O$, BaO, MgO, SrO, ZnO, PbO, $TiO_2$, $MnO_2$, $ZrO_2$, $B_2O_3$, $Al_2O_3$, $Fe_2O_3$, $Sb_2O_3$, $P_2O_5$, $V_2O_5$, or a combination thereof for example. In some embodiments, the shell material includes a majority (by weight) of $SiO_2$ and optionally other components. Hollow glass microspheres can contain various different gases within the glass shell material. Exemplary gases include $H_2O$, $CO_2$, $SO_2$, $SO_3$, $F_2$, $N_2$, $O_2$, or mixtures thereof.

Commercially available hollow glass microspheres (also variously known as glass bubbles, glass microbubbles, and glass microballoons) include those available from 3M Company, Maplewood, Minnesota under the trade designation 3M GLASS BUBBLES in grades K37 ($D_{50}$=45 microns), S38 ($D_{50}$=40 microns), S38HS ($D_{50}$=40 microns), K42HS ($D_{50}$=22 microns), S60 ($D_{50}$=30 microns), S60HS ($D_{50}$=30 microns), and iM30K ($D_{50}$=16 microns).

Alternatively or in addition unexpanded (i.e., but thermally expandable) polymeric microspheres can be included in the composite foam precursor composition. If heated to a sufficient temperature they become expanded polymeric microspheres. Expansion may occur prior to formation of the composite foam or during its formation. For example, unexpanded polymeric microspheres can be added to a composite foam precursor composition containing ROMP cyclic monomer and ROMP catalyst prior to cure then heated to sufficient temperature to cause expansion to provide expanded polymeric microspheres.

Expandable polymeric microspheres are commercially available in various unexpanded average particle sizes, for example, in the range of 6 to 9 microns, in the range of 9 to 15 microns, in the range of 10 to 16 microns, in the range of 18 to 24 microns, in the range of 35 to 45 microns, and in the range of 28 to 38 microns. Some of the unexpanded particle size ranges are also available in more than one type of material.

Expandable polymeric microspheres typically encapsulate a propellant that is a liquid at room temperature and has a boiling point at atmospheric pressure below the softening point of the shell material. The propellant expands when heated causing expansion of the outer shell of the polymeric microspheres. For example, the polymeric microspheres can include a liquid or gas selected from isooctane, (2,2,4-trimethyl pentane), butanes, pentanes, hexanes, heptanes, petroleum distillates, or other liquids with a suitable boiling point or boiling point range or combinations thereof. In an embodiment, hydrocarbons such as isobutane, isopentane, n-pentane, n-hexane, petroleum ether or n-heptane can be utilized alone or in combination with isooctane.

In some preferred embodiments, the size of hollow glass microspheres and/or expanded polymeric microspheres is from one to 200 microns, more preferably 5 to 100 microns, and more preferably 10 to 85 microns, although this is not a requirement.

The total amount of hollow glass microspheres, expanded polymeric microspheres, and expandable polymeric microspheres in the curable composition may range, for example, from 1 to 50 percent by weight, preferably 5 to 30 percent by weight, based on the total weight of the curable and/or at least partially cured composition, although other amounts may also be used.

To maximize dimensional stability of the composite foam, it is typically desirable that no solvent be included in it. If solvent is used to help initially dissolve some component (e.g., to dissolve the ROMP catalyst prior to ROMP polymerization of the cyclic olefin), it is typically desirable to remove the solvent under vacuum before polymerizing the mixture. If the mixture is sensitive to ambient moisture and oxygen, it may be desirable to maintain the mixture under inert conditions.

In some preferred embodiments, (e.g., wireless telecommunications) the composite foam has a dielectric constant of less than or equal to 3.0, less than or equal to 2.5, less than or equal to 2.2, or even less than or equal to 2.0; however, this is not a requirement. Likewise, the composite foam may have a tan delta of less than 0.10, less than 0.05, less than 0.03, or even less than 0.02.

The composite foam may further comprise one or more optional additives. Examples include plasticizers, antioxidants, UV stabilizers, colorants (e.g., carbon black), fillers, and polymeric and/or inorganic fibers.

Exemplary fillers include silica (e.g., fumed silica), alumina (e.g., alpha alumina), zirconia, carbon black, titania, zircoaluminate, and combinations thereof. Combinations of fillers may be used. Typical amounts may be up to 10 volume percent, 20 volume percent, 30 volume percent, 40 volume percent, or even up to 50 volume percent, although this is not a requirement.

Exemplary plasticizers include esters such as dioctyl phthalate (i.e., di(ethylhexyl) phthalate), dioctyl sebacate, butyl oleate, and aromatic and paraffinic oils (e.g., mineral oil). Combinations of plasticizers may be used. The amount of plasticizer will be dictated by the target glass transition temperature ($T_g$) of the at least partially cured composition, with higher amounts leading to lower values of $T_g$.

Composite foams according to the present disclosure may have an average cell size (i.e., pore size) in a range from 10 to 3000 (in some embodiments, 10 to 2000, 10 to 1000, 10 to 500, or even 10 to 100) micrometers, although other cell sizes are also permitted. In some embodiments, composite foams according to the present disclosure have a total porosity of at least 5 (in some embodiments, at least 10, 20, 25, 30, 40, 50, 60, or even at least 70 volume percent; in some embodiments, in a range from 10 to 70, 10 to 60, or even 10 to 50) volume percent, based on the total volume of the composite foam. Likewise, the composite foams may have a density of 0.05 to 0.95 g/cm$^3$, 0.05 to 0.75 g/cm$^3$, 0.05 to 0.50 g/cm$^3$, 0.05 to 0.40 g/cm$^3$, or even 0.05 to 0.30 g/cm$^3$.

The composite foam may have a $T_g$, for example, in a range of from −50° C. to 350° C., although other values (including no $T_g$) are also permissible. In some preferred embodiments, the composite foam has a $T_g$ of at least 100° C., at least 110° C., at least 120° C., at least 130° C., or even at least 140° C.

Composite foams according to the present disclosure can be prepared, for example, by heating a curable composition for sufficient time and at sufficient temperature to result in at least partial curing, preferably substantially full curing, of the curable composition and, if present, expansion of any unexpanded polymeric microspheres.

The curable composition may comprise (e.g., as described hereinabove):

at least one monomer polymerizable by ring-opening metathesis polymerization;

at least one catalyst for the ring-opening metathesis polymerization;

at least one difunctional coupling agent represented by

Z—X—Z wherein each Z independently represents a group that is chemically reactive with at least one of the surface hydroxyl groups of one of the abrasive particles thereby forming at least one covalent bond, and wherein each X independently represents a divalent organic linking group have a number average molecular weight of 500 to 10000 grams per mole; and at least one of hollow glass microspheres, expanded polymeric microspheres, and/or unexpanded polymeric microspheres.

Exemplary unexpanded polymeric microspheres include those commercially available under the trade designations EXPANCEL WU and EXPANCEL DU from Nouryon. Exemplary EXPANCEL WU microspheres include EXPANCEL 551 WU 40 ($D_{50}$=9-15 microns), EXPANCEL 461 WU 20 ($D_{50}$=6-9 microns), EXPANCEL 461 WU 40 ($D_{50}$=9-15 microns), EXPANCEL 551 WU 40 ($D_{50}$=9-15 microns), EXPANCEL 053 WU 40 ($D_{50}$=10-16 microns), EXPANCEL 909 WU 80 ($D_{50}$=18-24 microns), EXPANCEL 920 WUF 80 ($D_{50}$=10-16 microns). Exemplary EXPANCEL DU unexpanded polymeric microspheres include EXPANCEL 551 DU 40 ($D_{50}$=9-15 microns); EXPANCEL 461 DU 20 ($D_{50}$=6-9 microns); EXPANCEL 461 DU 40 ($D_{50}$=9-15 microns); EXPANCEL 051 DU 40 ($D_{50}$=9-15 microns); EXPANCEL 053 DU 40 ($D_{50}$=10-16 microns); EXPANCEL 093 DU 120 ($D_{50}$=28-38 microns); EXPANCEL 909 DU 80 ($D_{50}$=18-24 microns); EXPANCEL 920 DU 80 ($D_{50}$=18-24 microns); EXPANCEL 920 DU 120 ($D_{50}$=28-38 microns); EXPANCEL 930 DU 120 ($D_{50}$=28-38 microns); EXPANCEL 920 DU 40 ($D_{50}$=10-16 microns); EXPANCEL 930 DU 120 ($D_{50}$=28-38 microns); EXPANCEL 950 DU 80 ($D_{50}$=18-24 microns); and EXPANCEL 980 DU 120 ($D_{50}$=25-40 microns).

The curable composition may be applied to the substrate(s) by any suitable techniques such as, for example, dipping, spraying, brushing, and nozzle dispensing. Once applied to the substrate(s), the curable composition may be heated to accelerate cure; for example, to at least 50° C., at least 75° C., at least 100° C., or at least 150° C. to provide an article according to the present disclosure.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Table 1 (below) lists materials used in the examples and their sources.

TABLE 1

| DESIGNATION | DESCRIPTION | SOURCE |
| --- | --- | --- |
| CB2 | Crosslinkable binder; olefin thermoset resin obtained as PROXIMA HTI 1837 | Materia Inc. |
| CB3 | Crosslinkable binder; olefin thermoset resin obtained as PROXIMA HPR 2128 | Materia Inc. |
| C1 | Catalyst; Olefin metathesis catalyst (1% in mineral oil), obtained as PROXIMA CT 714 | Materia Inc. |
| C2 | Catalyst; Olefin metathesis catalyst (1% in mineral oil), obtained as PROXIMA CT- 170 | Materia Inc. |
| C3 | Catalyst; Olefin metathesis catalyst (1% in mineral oil), obtained as PROXIMA CT- 762 | Materia Inc. |
| GB1 | Glass bubbles, obtained as SCOTCHLITE S32HS | 3M Company, Maplewood, Minnesota |
| GB2 | Glass bubbles, obtained as SCOTCHLITE 16K | 3M Company |
| EM1 | Expandable microspheres, obtained as EXPANCEL 461 DU 20 | Nouryon, Amsterdam, The Netherlands |
| EM2 | Expandable microspheres, obtained as EXPANCEL 043 DU 80 | Nouryon |
| AP1 | Adhesion promoter; Modified diphenylmethane diisocyanate (MDI)-terminated polyether prepolymer based on polytetramethylene ether glycol (PTMEG) obtained as BAYTEC ME-230 | Covestro, Pittsburgh, Pennsylvania |
| AP2 | Adhesion promoter; Silane-terminated polybutadiene obtained as Polyvest ST-M | Evonik Industries AG, Essen, Germany |

Test Methods
Overlap Shear Test Method

For metallic substrates, two 1 inch (2.54 centimeter (cm)) wide×4 inch (10 cm) long×0.125 inch (0.32 cm) thick coupons were cleaned using Toluene. At the tip of one coupon, a 1 inch by 1 inch (2.54 cm×2.54 cm) square was covered by the mixed compound and then contacted with another coupon in the opposite tip direction. Clips were used to hold the two halves together during the curing process. The approximate thickness of the material between the coupons was between 2-5 mils (0.05-0.13 millimeter (mm)). The samples were then conditioned at room temperature for 24 hours prior to overlap shear testing.

OLS tests were conducted on an Instron Universal Testing Machine model 1122 (Instron Corporation, Norwood, MA) according to the procedures of ASTM D1002-01 (2001), "Standard Test Method for Apparent Shear Strength of Single-Lap-Joint Adhesively Bonded Metal Specimens by Tension Loading (Metal-to-Metal)." The crosshead speed was 0.1 inch/minute (2.5 mm/min).

Dielectric Property Measurement Test Method

The dielectric breakdown strength measurements were performed according to ASTM D149-20 "Standard Test Method for Dielectric Breakdown Voltage and Dielectric Strength of Solid Electrical Insulating Materials at Commercial Power Frequencies" (2020) with the Phoenix Technologies Model 6TC4100-10/50-2/D149 that is uniquely designed for testing both the 1-50 kV, 60 Hz (higher voltage) AC breakdown range and the 3-100 kV, (higher voltage) DC breakdown range. Each measurement was performed while the sample was immersed in the fluid indicated. The average breakdown strength is typically based on an average of measurements from 10 or more samples. A frequency of 60 Hz and a ramp rate of 500 volts per second were used.

A split post dielectric resonator, ASTM 2520-13 "Standard Test Methods for Complex Permittivity (Dielectric Constant) of Solid Electrical Insulating Materials at Microwave Frequencies and Temperatures to 1650° C." (2013) was utilized to measure the dielectric constant and loss with an uncertainty of approximately 0.5%, and dielectric loss tangents with a resolution of $5\times10^{-5}$ for laminar dielectric specimens.

Dynamic Mechanical Analysis Pest Method

Dynamic mechanical properties were performed according to ASTM D7028-07 (2015) "Standard Test Method for Glass Transition Temperature (DMA $T_g$) of Polymer Matrix Composites by Dynamic Mechanical Analysis (DMA)" (2015) and were measured in tensile mode using a DMA Q800 instrument (TA Instruments, Eden Prairie, Minnesota). The tests were run at a ramp rate of 2° C./minute at frequency of 1 Hz using the strain module.

Procedure for Making Adhesive Foams

The compositions were prepared by hand mixing all components together, in amounts as reported in Table 2, in a glass jar under continuous stirring with a tongue depressor. The bubbles or expandable microspheres were added first and allowed to incorporate as the liquid matrix was poured in. Adhesion promoter and catalyst were then added and mixing continued until a homogeneous mix was obtained. The mixture was then poured into molds or prepared glass plates with spacers. By "prepared glass plates" it is meant coated with a release agent or spray. The poured mixture was allowed to breathe for a few minutes to allow for any bubbles to come up to the surface and disappear before being placed in an oven for 30 minutes at 100° C. The foams were then removed from the oven and allowed to cool without removing from the mold. Once at room temperature, the foamed films or parts were removed from the molds and tested. Table 2 reports the foam compositions. Table 3 reports the test results.

TABLE 2

| EXAMPLE | COMPONENT, percent by weight |||||||||||||| 
|---|---|---|---|---|---|---|---|---|---|---|---|---|---|---|
| | CB1 | CB2 | CB3 | GB1 | GB2 | EM1 | EM2 | EM3 | C1 | C2 | C3 | C4 | AP1 | AP2 |
| EX-1 (Hard Foam) | | | 94.3 | | | 3.7 | | | 1.5 | | | | 0.5 | |
| EX-2 (Hard Foam) | | | 94.3 | | | | 3.7 | | 1.5 | | | | 0.5 | |
| EX-3 (Hard Foam) | | | 94.3 | | | 3.7 | | | | | 1.5 | | | 0.5 |
| EX-4 (Hard Foam) | | | 79.5 | 19 | | | | | | | 1 | | | 0.5 |
| EX-5 (Elastomeric Foam) | | 94.3 | | | | | 3.7 | | 1.5 | | | | 0.5 | |
| EX-6 (Elastomeric Foam) | | 94.3 | | | | | | 3.7 | 1.5 | | | | 0.5 | |
| Comparative CB3 (not foamed) | | | 99.5 | | | | | | | | 0.5 | | | |

TABLE 3

| Example | Thickness, mm | Dielectric Properties at 9.5 GHz, 25° C. and 46% Relative Humidity ||| Dynamic Mechanical Analysis at 2° C./min, 1 Hz || Adhesion to Copper, 2.5 mm/min || Adhesion to Aluminum, 2.5 mm/min |
|---|---|---|---|---|---|---|---|---|---|
| | | eps' | eps" | TAN DELTA | E' DEFLECTION POINT, ° C. | TAN DELTA MAX, ° C. | OVERLAP SHEAR STRENGTH, MPa | STRAIN TO FAILURE, % | OVERLAP SHEAR STRENGTH, MPa |
| EX-1 | 0.37 | 2.43 | 0.0090 | 0.0037 | 109 | 141 | 8 | 5 | |

TABLE 3-continued

| Example | Thickness, mm | Dielectric Properties at 9.5 GHz, 25° C. and 46% Relative Humidity | | | Dynamic Mechanical Analysis at 2° C./min, 1 Hz | | Adhesion to Copper, 2.5 mm/min | | Adhesion to Aluminum, 2.5 mm/min |
|---|---|---|---|---|---|---|---|---|---|
| | | eps' | eps" | TAN DELTA | E' DEFLECTION POINT, ° C. | TAN DELTA MAX, ° C. | OVERLAP SHEAR STRENGTH, MPa | STRAIN TO FAILURE, % | OVERLAP SHEAR STRENGTH, MPa |
| EX-2 | 0.26 | 2.49 | 0.0094 | 0.0038 | | | | | |
| EX-3 | | | | | | | | | 2 |
| EX-4 | | | | | | | | | 19 |
| EX-5 | 0.57 | 2.46 | 0.0165 | 0.0067 | | | | | |
| EX-6 | 0.51 | 2.09 | 0.0032 | 0.0015 | 4 | 17 | | | |
| Comparative CB3 (not foamed) | 0.31 | 2.493 | 0.00941 | 0.00391 | | | | | |

The preceding description, given in order to enable one of ordinary skill in the art to practice the claimed disclosure, is not to be construed as limiting the scope of the disclosure, which is defined by the claims and all equivalents thereto.

What is claimed is:

1. An article comprising
   a first substrate having a first portion comprising a first metal or ceramic metal oxide comprising surface hydroxyl groups; and
   a composite foam bonded to the at least one of the first metal, the composite foam comprising:
      at least one polymer preparable by ring-opening metathesis polymerization of at least one cyclic olefin;
      at least one catalyst for the ring-opening metathesis polymerization;
      at least one difunctional coupling agent represented by

Z—X—Z wherein each Z independently represents a group that is chemically reactive with the surface hydroxyl groups thereby forming at least one covalent bond, and
      wherein X independently represents a divalent organic linking group have a number average molecular weight of 500 to 10000 grams per mole; and
      at least one of hollow glass microspheres or expanded polymeric microspheres.

2. The article of claim 1, wherein each X independently represents a divalent organic linking group have a number average molecular weight of 600 to 6000 grams per mole.

3. The article of claim 1, wherein the at least one polymer preparable by ring-opening metathesis polymerization of at least one cyclic olefin comprising at least one of dicyclopentadiene, norbornene, ethylidenenorbornene, cyclopentene, cyclooctene, tricyclopentadiene, tetracyclopentadiene, norbornadiene, 7-oxabicyclo[2.2.1]hept-2-ene, tetracyclo[6.2.13.6.0]dodeca-4,9-diene, hexylnorbornylene, cyclopentadiene, alkyl norbornene, or an oligomer thereof.

4. The article of claim 1, wherein the at least one catalyst for the ring-opening metathesis polymerization comprises at least one of a ruthenium, tungsten, osmium, or molybdenum ring-opening metathesis polymerization catalyst.

5. The article of claim 1, wherein each Z is —N=C=O.

6. The article of claim 1, wherein the at least one difunctional coupling agent comprises an isocyanate-terminated polyurethane prepolymer of 4,4'-diphenylmethane and a polyalkylene glycol.

7. The article of claim 1, wherein the at least one difunctional coupling agent comprises a diphenylmethane diisocyanate-terminated polyether prepolymer based on polytetramethylene ether glycol.

8. The article of any of claim 1, wherein each X independently comprises a polyoxyalkylene segment.

9. The article of claim 1, wherein each X independently comprises at least one of a polyethylene oxide segment, a polypropylene oxide segment, or a polybutylene oxide segment.

10. The article of claim 1, wherein each X independently comprises a polybutadiene segment.

11. The article of claim 1, wherein Z is —SiR6aL2(3-a), wherein L2 represents a hydrolyzable group, wherein R6 represents an alkyl group having from 1 to 4 carbon atoms, and wherein a is 0, 1, or 2.

12. The article of claim 1, wherein the composite foam comprises the hollow glass microspheres.

13. The article of claim 1, wherein the composite foam comprises the expanded polymeric microspheres.

14. The article of claim 1, wherein the composite foam has a dielectric constant of less than or equal to 2.5 and a tan delta of less than 0.02.

15. The article of claim 1, wherein the first portion comprises at least one of copper, silver, or aluminum.

16. The article of claim 1, wherein the first portion comprises the first ceramic metal oxide.

17. The article of claim 1, further comprising a second substrate having a second portion comprising at least one of a second metal or a second ceramic metal oxide, wherein the composite foam is further in contact with the second portion.

18. The article of claim 17, wherein the second portion comprises the second metal.

19. The article of claim 1, wherein the article comprises an electronic device.

20. The article of claim 1 wherein the first portion comprises copper or aluminum.

* * * * *